US012090101B2

(12) United States Patent
Srinivasan et al.

(10) Patent No.: US 12,090,101 B2
(45) Date of Patent: Sep. 17, 2024

(54) EXTENDED WHEELCHAIR AND AN ATTACHMENT DEVICE FOR THE WHEELCHAIR

(71) Applicants: Indian Institute of Technology Madras (IIT Madras), Chennai (IN); NeoMotion Assistive Solutions Pvt. Ltd, Chennai (IN)

(72) Inventors: Sujatha Srinivasan, Chennai (IN); Swostik Sourav Dash, Chennai (IN); Vivek Sarda, Chennai (IN)

(73) Assignees: INDIAN INSTITUTE OF TECHNOLOGY MADRAS (IIT Madras), Chennai (IN); NEOMOTION ASSISTIVE SOLUTIONS PVT. LTD, Chennai (CN)

( * ) Notice: Subject to any disclaimer, the term of this patent is extended or adjusted under 35 U.S.C. 154(b) by 828 days.

(21) Appl. No.: 17/262,446

(22) PCT Filed: Jul. 9, 2019

(86) PCT No.: PCT/IN2019/050507

§ 371 (c)(1),
(2) Date: Jan. 22, 2021

(87) PCT Pub. No.: WO2020/021562

PCT Pub. Date: Jan. 30, 2020

(65) Prior Publication Data

US 2021/0228427 A1 Jul. 29, 2021

(30) Foreign Application Priority Data

Jul. 23, 2018 (IN) ............................ 201841027569

(51) Int. Cl.
*A61G 5/04* (2013.01)
*A61G 5/10* (2006.01)

(52) U.S. Cl.
CPC ............ *A61G 5/1054* (2016.11); *A61G 5/047* (2013.01); *A61G 5/1089* (2016.11)

(58) Field of Classification Search
CPC ..... A61G 5/1054; A61G 5/047; A61G 5/1089
See application file for complete search history.

(56) References Cited

U.S. PATENT DOCUMENTS

| | | | | |
|---|---|---|---|---|
| 4,386,672 A * | 6/1983 | Coker | .................... | A61G 5/047 180/907 |
| 4,503,925 A * | 3/1985 | Palmer | .................... | A61G 5/047 180/13 |

(Continued)

FOREIGN PATENT DOCUMENTS

| | | | | |
|---|---|---|---|---|
| EP | 1797853 A2 * | 6/2007 | ............... | A61G 5/10 |
| WO | WO-9830435 A1 * | 7/1998 | ............. | A61G 5/006 |

*Primary Examiner* — Kevin Hurley
*Assistant Examiner* — Michael R Stabley

(57) ABSTRACT

Embodiments herein disclose an extended wheel chair having a wheel chair and an attachment device. The wheel chair comprises a body having each of first body part and a second body part mounted over a frame on the wheel chair. The second body part comprises at least two pins and a flat plate. The wheel chair further comprises an attachment device to be mechanically locked to the body of the wheel chair. The attachment device comprises of a body provided with each of a first slot and a second slot. First pin of the at least two pins is engaged with the first slot and a second pin of the at least two pins is engaged with the second slot.

24 Claims, 13 Drawing Sheets

(56) References Cited

U.S. PATENT DOCUMENTS

| | | | | |
|---|---|---|---|---|
| 5,501,480 | A * | 3/1996 | Ordelman | A61G 5/026 280/250 |
| 6,267,190 | B1 * | 7/2001 | Micheletti | B62K 3/002 180/196 |
| 6,883,632 | B2 * | 4/2005 | McHardy | A61G 5/047 180/315 |
| 7,216,728 | B2 * | 5/2007 | Huang | A61G 5/1051 180/13 |
| 8,684,113 | B1 * | 4/2014 | Laconis | A61G 5/047 180/11 |
| 9,084,710 | B2 * | 7/2015 | Paul | A61G 5/00 |
| 9,198,814 | B2 * | 12/2015 | Paul | A61G 5/101 |
| 9,326,901 | B2 * | 5/2016 | Conte | B62B 3/0612 |
| 9,872,805 | B2 * | 1/2018 | Bach Castillo | A61G 5/1005 |
| 10,299,973 | B2 * | 5/2019 | Conte | A61G 5/04 |
| 10,857,046 | B2 * | 12/2020 | Kim | A61G 5/047 |
| 10,888,474 | B2 * | 1/2021 | Kim | A61G 5/047 |
| 10,980,685 | B2 * | 4/2021 | Benedini | A61G 5/1051 |
| 2003/0094778 | A1 * | 5/2003 | Hungerbuhler | B62B 3/027 280/47.131 |
| 2007/0096427 | A1 * | 5/2007 | Knaub | A61G 5/042 280/304.1 |
| 2016/0144925 | A1 * | 5/2016 | Wang | B62K 25/005 280/259 |

* cited by examiner

EXTENDED WHEELCHAIR AND AN ATTACHMENT DEVICE FOR THE WHEELCHAIR

FIELD OF INVENTION

The present disclosure relates to wheel chair, and more particularly to external attachment components for the wheel chair. The present application is based on, and claims priority from International application PCT/IN2019/050507 filed on 9 Jul. 2019 and an Indian application Ser. No. 201841027569 filed on 23 Jul. 2018, the disclosure of which is hereby incorporated by reference herein.

BACKGROUND OF INVENTION

Wheel chairs are in use since ages. Wheel chairs are generally used to provide mobility to people who have difficulty in walking or moving. Wheel chairs may be seen in large number of designs. Current designs of wheel chairs are focusing more on automation and comfort of a user.

Wheel chairs are generally used as mobility devices on flat terrain for limited distances. It might be exhausting for users to manually propel the wheel chair for travelling long distances. Motorized wheel chairs provide the user with an ability to traverse long distances. However, even the motorized wheel chairs encounter difficulty in handling over uneven terrain and also lacks portability.

Current technology has proposed clip-on device for supporting battery powered or hand powered motion of the wheel chair and may be detached from the wheelchair when not in use. Such clip-on device though offers a lot of benefits, however, ease of attachment and detachment of these clip-on device is still a challenge. Furthermore, such clip-on devices lack in stability, specifically on uneven terrain, due to a small base of support.

OBJECT OF INVENTION

The principal object of the embodiments herein is to provide an extended wheel chair.

Another object of the embodiment is to provide a wheel chair in the extended wheel chair for supporting external attachment device.

Another object of the embodiment is to provide an attachment device to be mechanically locked with the wheel chair.

Yet another object of the embodiment is to provide a primary locking mechanism and a secondary locking mechanism for mechanically locking of the attachment device to the wheel chair in the extended wheel chair.

SUMMARY

Accordingly, present disclosure relates to an extended wheel chair comprising a wheel chair having a body comprising each of first body part and a second body part mounted over a frame on the wheel chair. The first body part comprises at least two pins and a flat plate. The wheel chair further comprises an attachment device to be mechanically locked to the body of the wheel chair. The attachment device comprises a body provided with each of a first slot and a second slot. The first pin of the at least two pins is engaged with the first slot and a second pin of the at least two pins is engaged with the second slot.

Accordingly, present disclosure relates to a wheel chair comprising a body part having each of first body part and a second body part mounted over a frame on the wheel chair. The second body part comprises at least two pins and a flat plate and each of first pin and a second pin of the at least two pins to be engaged with one or more slots of an attachment device in order to enable a mechanical locking of the attachment device with the wheel chair.

Accordingly, present disclosure relates to an attachment device for a wheel chair. The attachment device comprises a body provided with each of a first slot and a second slot. Each of the first slot and the second slot are configured to be engaged with one or more pins in the wheelchair. The attachment device further comprises a stand having one or more wheels for supporting the mechanical locking of the attachment device with the wheel chair These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This extended wheel chair having a wheel chair and an attachment device is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein provide an extended wheel chair with a wheel chair and an attachment device for the wheel chair. The attachment device may be mechanically locked to the wheel chair through each of a primary locking arrangement and a secondary locking arrangement. The attachment device is provided with each of stand for supporting the mechanical locking of the attachment device to the wheel chair and a flat barrier for protecting any leg accident of a user. The attachment device is designed to save the extended wheel chair from any kind of side topple on uneven surface. Attachment and detachment of the attachment device is easy with easy detachment lever arrangement in the attachment device.

Figure 1A:
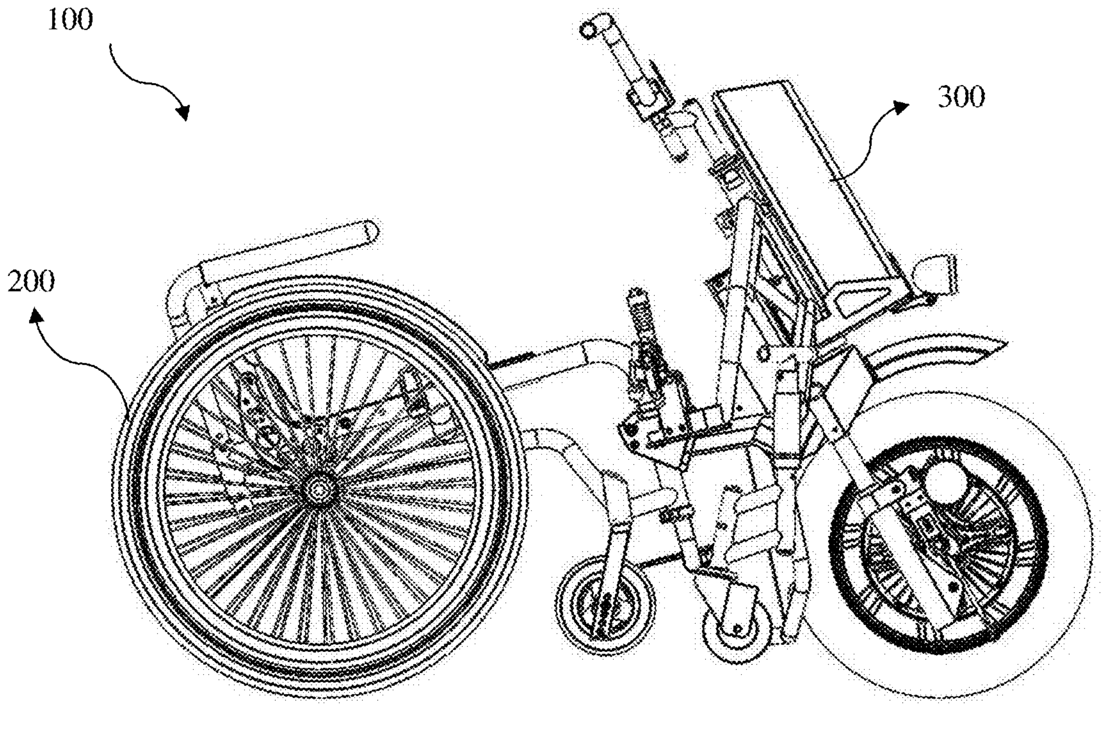
FIG. 1A shows a side view of an extended wheel chair, according to embodiments as disclosed herein.

In accordance with an embodiment, referring to FIG. 1A, a configuration of an extended wheel chair 100 is shown. Referring to 1A and FIG. 2A in combination, the extended wheel chair 100 comprises a wheel chair 200 with a body 202 having each of first body part 204 and a second body part 206 mounted over a frame 208 on the wheel chair 200. The second body part 206 comprises at least two pins 210 and a flat plate 212.

Figure 3A:
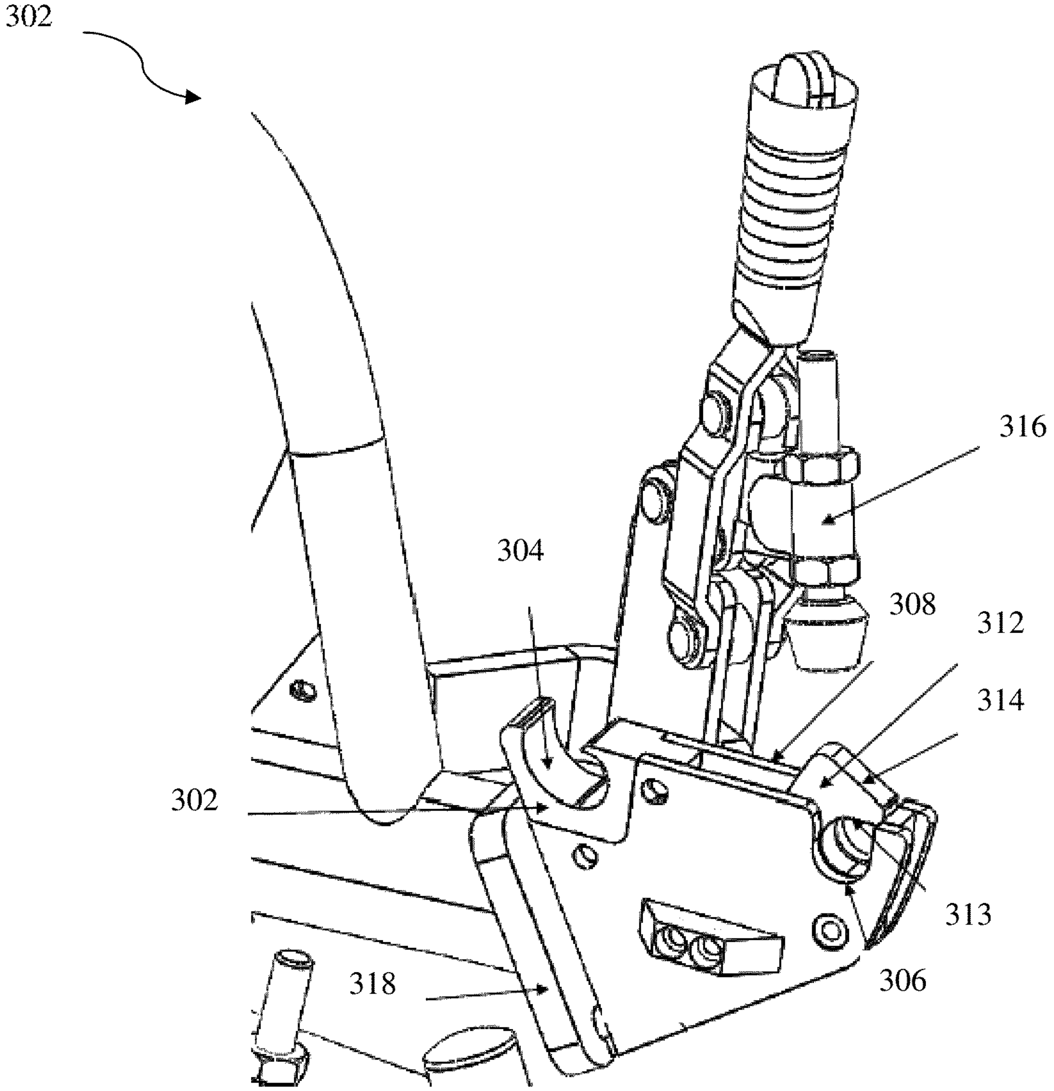
FIG. 3A shows details of body of the attachment device in the extended wheel chair, according to embodiments as disclosed herein.

Referring to 1A and FIG. 3A in combination, the extended wheel chair 100 further comprises an attachment device 300 to be mechanically locked to the body 202 of the wheel chair 200. The attachment device 300 comprises a body 302 provided with each of a first slot 304 and a second slot 306. First pin 214 of the at least two pins 210 is engaged with the first slot 304 and a second pin 216 of the at least two pins 210 is engaged with the second slot 306.

Figure 1B:
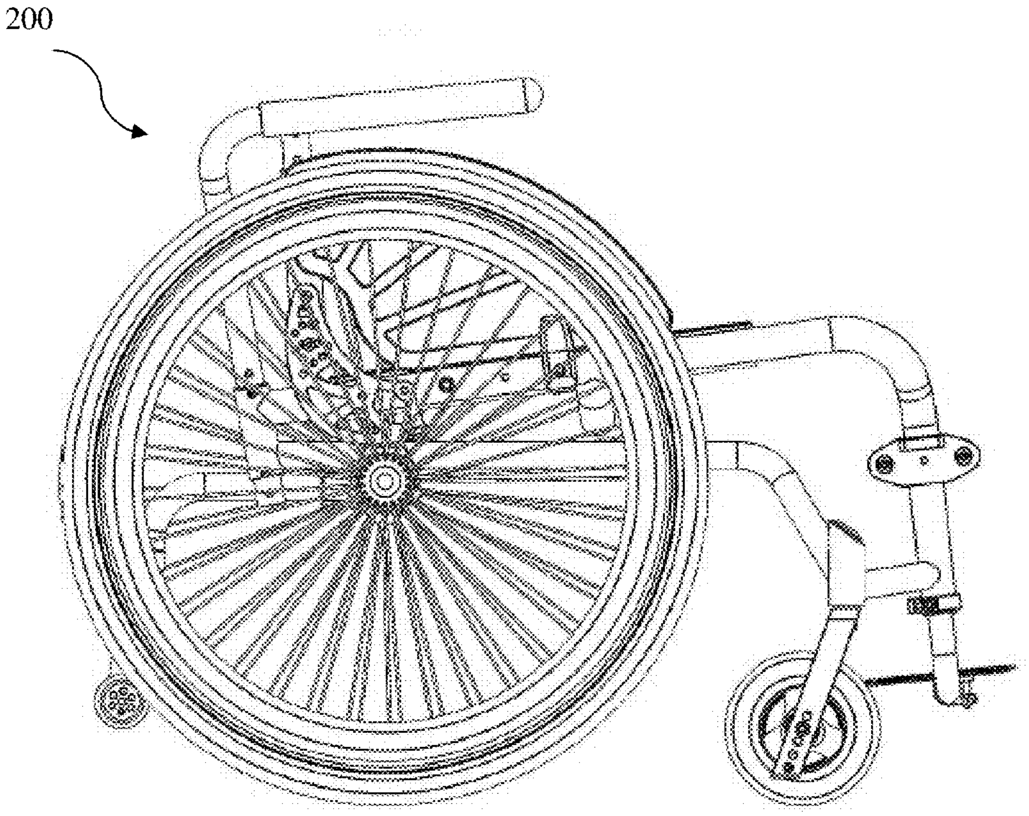
FIG. 1B shows a side view of a wheelchair in the extended wheel chair, according to embodiments as disclosed herein.

In another embodiment, referring to FIG. 1B the wheel chair 200 without the attachment device 300 is shown. The wheel chair 200 in FIG. 1B is similar to the extended wheel chair 100 in FIG. 1A, only difference is the attachment device 300 is removed from the extended wheel chair 100. Therefore, the extended wheel chair 100 in FIG. 1A without the attachment device 300 is similar to the wheel chair 200 in FIG. 1B.

Figure 1C:
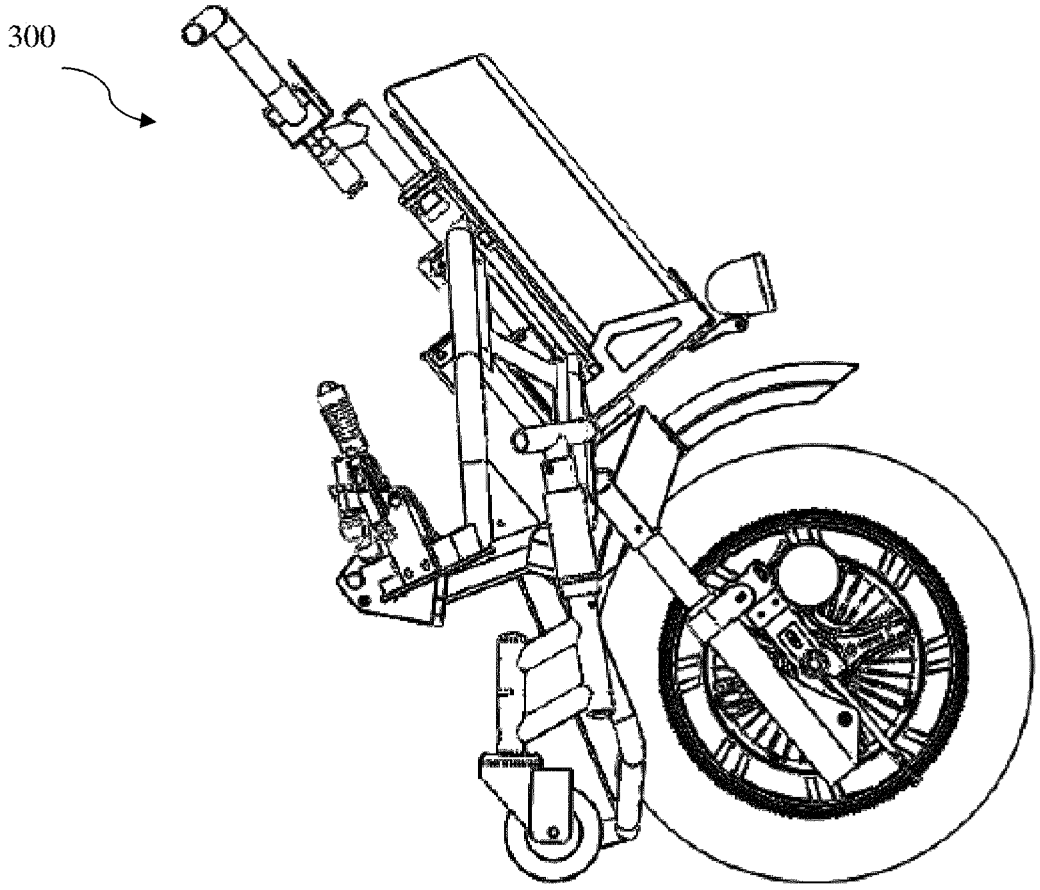
FIG. 1C shows a side view of an attachment device in the extended wheel chair, according to embodiments as disclosed herein.

In another embodiment, the attachment device 300 is shown in FIG. 1C. The attachment device 300 as shown in FIG. 1C is similar to the attachment device 300 shown attached to the extended wheel chair 100 of FIG. 1A.

Details of each of the wheel chair 200 and the attachment device 300 in the extended wheel chair 100 will now be explained. Still referring to FIG. 2A, details of the body 202 of the wheel chair 200 are shown. Each of first body part 204 and the second body part 206 are mounted over the frame 208 on the wheel chair 200. The first body part 204 comprises the at least two pins 210 and the flat plate 212. Each of the at least two pins 210 work as a primary lock and the flat plate 212 serves as a secondary lock. Therefore, the wheel chair 200 is provided with two locks (primary lock and the secondary lock) in the body 202 making the wheel chair 200 compact and stable.

Figure 2A:
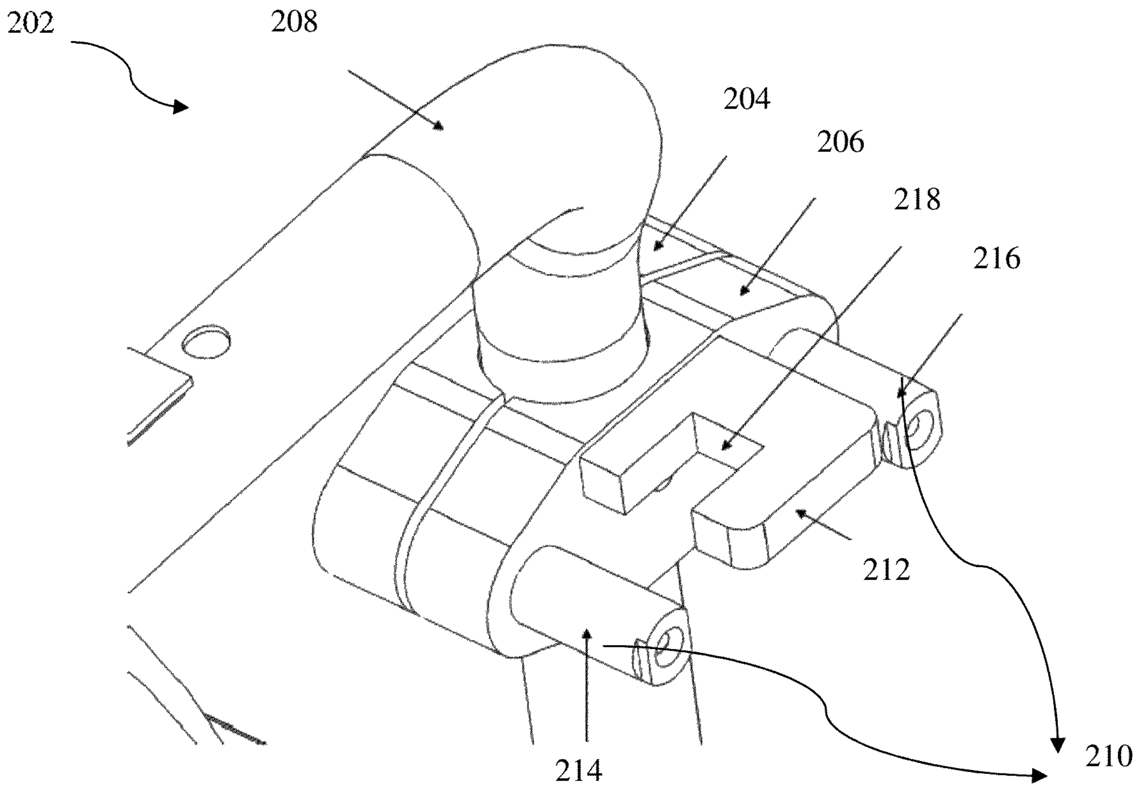
FIG. 2A shows a detail of body of the wheel chair in the extended wheel chair, according to embodiments as disclosed herein.
Figure 2B:
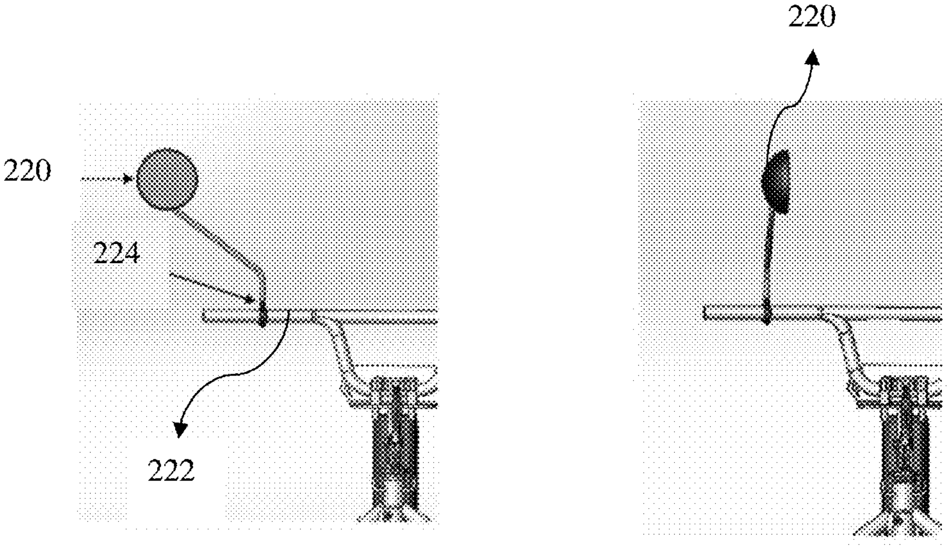
FIG. 2B shows the attachment device in extended wheel chair with mirror, according to an alternate embodiment as disclosed herein.

Referring to FIG. 2B, the wheel chair comprises a mirror 220 mounted on a handle of the attachment device 300.

Due to the lower height of the extended wheel chair device 100 as compared to motorcycles, driving on roads may be dangerous and difficult for the user. The mirror 220 is mounted on the handle 222 in order to increase each of a height and width of the extended wheelchair 100 and to increase visibility. The mirror 220 may be folded inward about pivot 224 and makes the extended wheelchair 100 compact in narrow space and indoors.

In another embodiment, visibility flag (not shown in FIG.) may also be used to improve the visibility along with lighting and reflectors.

In accordance with an embodiment, referring to FIG. 3A, details of the body 302 of the attachment device 300 will now be explained. The attachment device 300 may be mechanically locked with the wheel chair 200 in the extended wheel chair 100. The mechanical locking refers to each of the primary lock and the secondary lock as explained above.

Figure 3B:
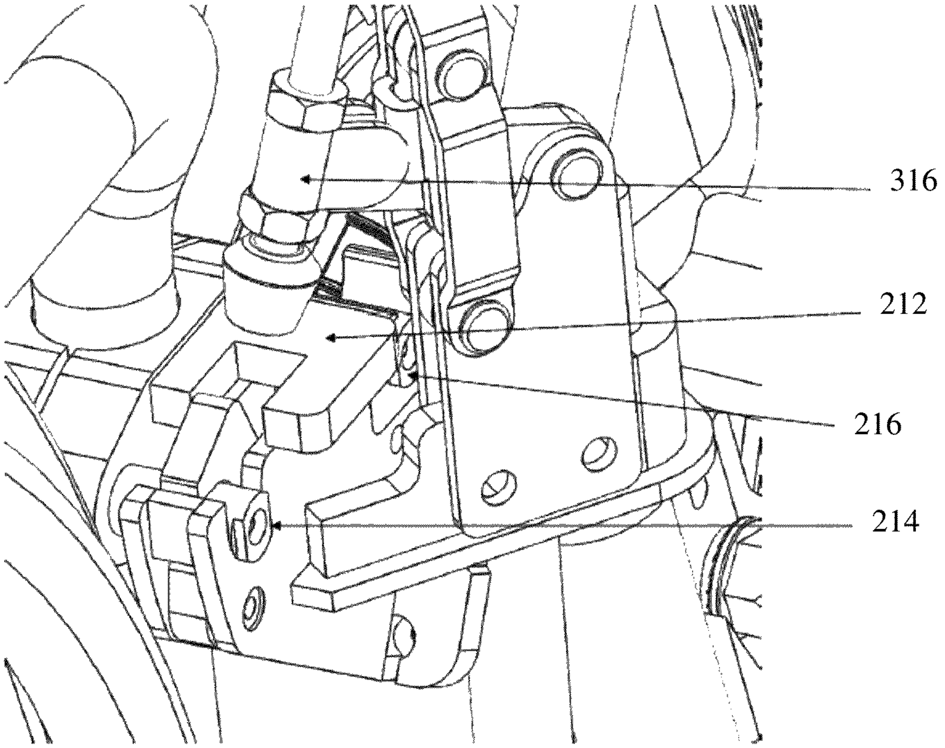
FIG. 3B illustrates engagement of pins of the wheel chair with slots in the attachment device, according to embodiments as disclosed herein.

The first slot 304 of the attachment device 300 is engaged with the first pin 214 of the wheelchair 200. The first slot 304 is engaged with the first pin 214 with help of a slope 308. In order to lock the attachment device 300 with the wheel chair 200, a user needs to pull the attachment device 300 straight and the slope 308 guides the first pin 214 into the first slot 304. FIG. 3B shows the engagement of each of the first pin 214 in the first slot 304 and the second pin 216 in the second slot 306.

Referring to FIG. 3A, after the first pin 214 is engaged with the first slot 304, the attachment device 300 is provided with a handlebar 310 (or simply handle) for pivoting the clip-on on the first pin 214 so that second pin 216 is engaged with the second slot 306. Still referring to FIG. 3A, the attachment device 300 further comprises a stopper 312 designed in a way so as to enable a one-way movement and allows the second pin 216 to go into the second slot 306 but doesn't allow the second pin 216 to come out of the second slot 306. The second pin 216 may approach the stopper 312 form a top position and pushes the stopper 312 back against an incline 314. An inner surface 313 of the stopper 312 is provided with a tapered profile to provide a no-play fit between each of the stopper 312 and the second pin 216. Each of the slot 304 and 306, the slope 308, toggle lock 316 and the stopper 312 are provided on a part in the attachment device. The part may be welded on the plate 318.

In FIG. 2A, the flat plate 212 of the second body part 206 comprises a slot 218. The slot 218 of the flat plate 212 is designed so as not to hinder with a movement of the stopper 312. The engagement of each of the first pin 214 into the first slot 304 and the second pin 216 into the second slot 306 enables a primary locking between the attachment device 300 and the wheel chair 200.

In an embodiment, the wheel chair 200 is designed in a way such that the first pin 214 is lower than the first slot 304. By this, the handle 310 in FIG. 3C may not require much rotation and makes each of an attachment of the attachment device 300 and detachment of the attachment device 300 easier with the wheel chair 200.

Still referring to FIG. 3A, the secondary locking between the attachment device 300 and the wheel chair 200 will now be explained. In configuration of the primary lock as explained above, the flat plate 212 presses against the body 302 of the attachment device 300 with slope 308 as a surface of contact. The attachment device 300 further comprises a toggle lock 316 to be actuated by the user. The toggle lock 316 acts as the secondary lock. In configuration of the secondary lock, the flat plate 212 is sandwiched between a toggle lock on top and the slope 308 on bottom. The toggle lock 316 is also provided to share load from the primary lock, unlike conventional designs where the secondary lock is only used only in case of failure of the primary lock. The secondary lock also reduces play in the attachment between the wheelchair 200 and the attachment device 300.

In accordance with an exemplary embodiment, referring to FIG. 3A, the toggle lock 316 may also be attached in a manner such that the toggle lock 316 obstructs movement of the stopper 312 backwards, thereby increasing a safety of the primary attachment mechanism. The attachment device 300 comprises a switch positioned between the toggle lock 316 and the flat plate 212. The switch gets activated when the toggle lock 316 is actuated. The switch may be designed in a way such that the attachment device 300 may not be powered on till the toggle lock 316 is actuated.

In an exemplary embodiment, the body 302 of the attachment device 300 may be welded on a plate 318 at one or more widths. The welding of the body 302 on the plate 318 enables the attachment of the attachment device 300 with the wheel chair 200 of different widths. The welding on the plate 318 eliminates a requirement of adjustable joints and makes the attachment device 300 stronger while reducing additional cost of production.

Figure 4A:
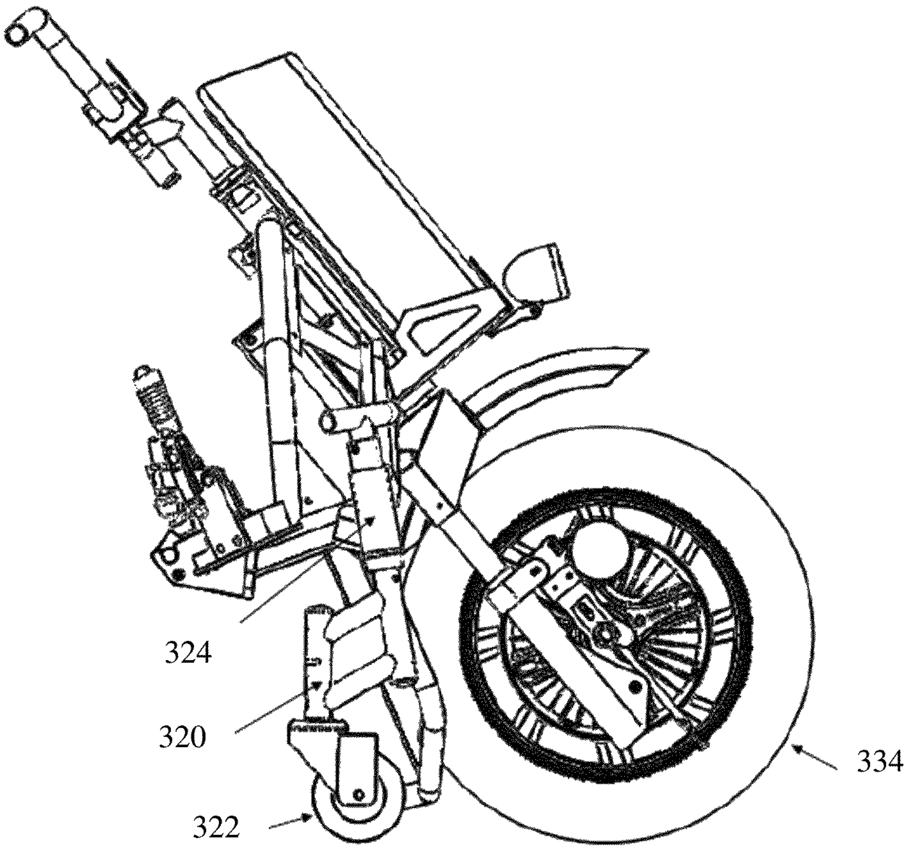
FIG. 4A shows details of stand in the attachment device, according to embodiments as disclosed herein.

In accordance with an embodiment, referring to FIG. 4A, the attachment device 300 further comprises a stand 320 with a wheel 322 to protect the wheel chair 200 from toppling sideways. Arrangement of stand 320 with one or more wheels 322 may be referred as anti-tipper of the wheel chair 200. During the use, the wheel 322 of the stand 320 stays above ground, whereas when the extended wheel chair 100 is tipped, the wheel 322 of the stand 320 touches the ground. The stand 320 is pivoted on a stand mount 324. The stand 320 is further loaded with spring against the stand mount 324.

Figure 4B:
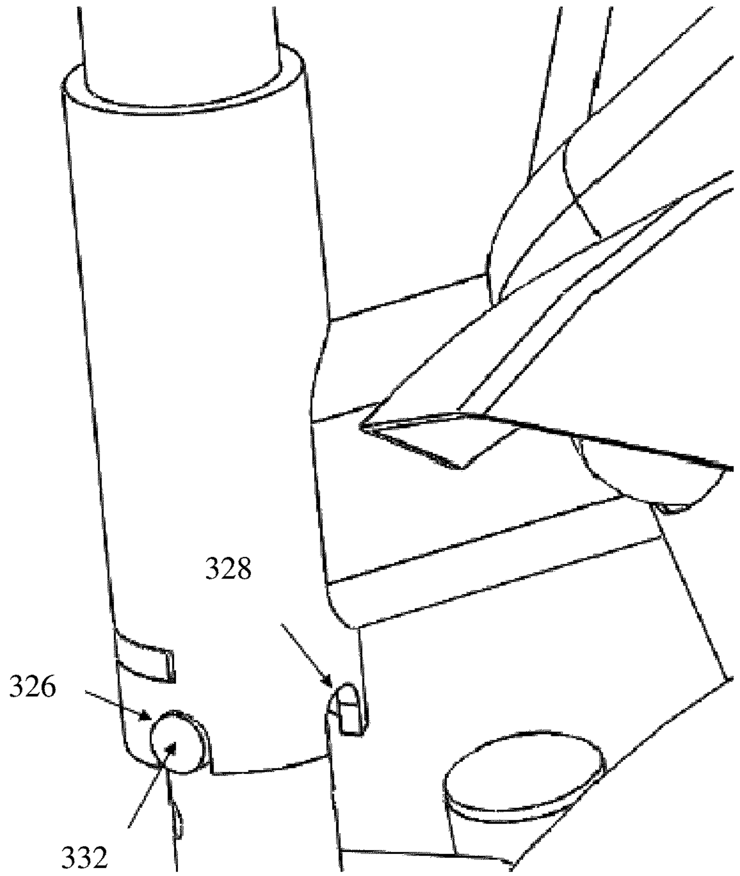
FIG. 4B and FIG. 4C shows additional details of the stand of in the attachment device, according to embodiments as disclosed herein.
Figure 4C:
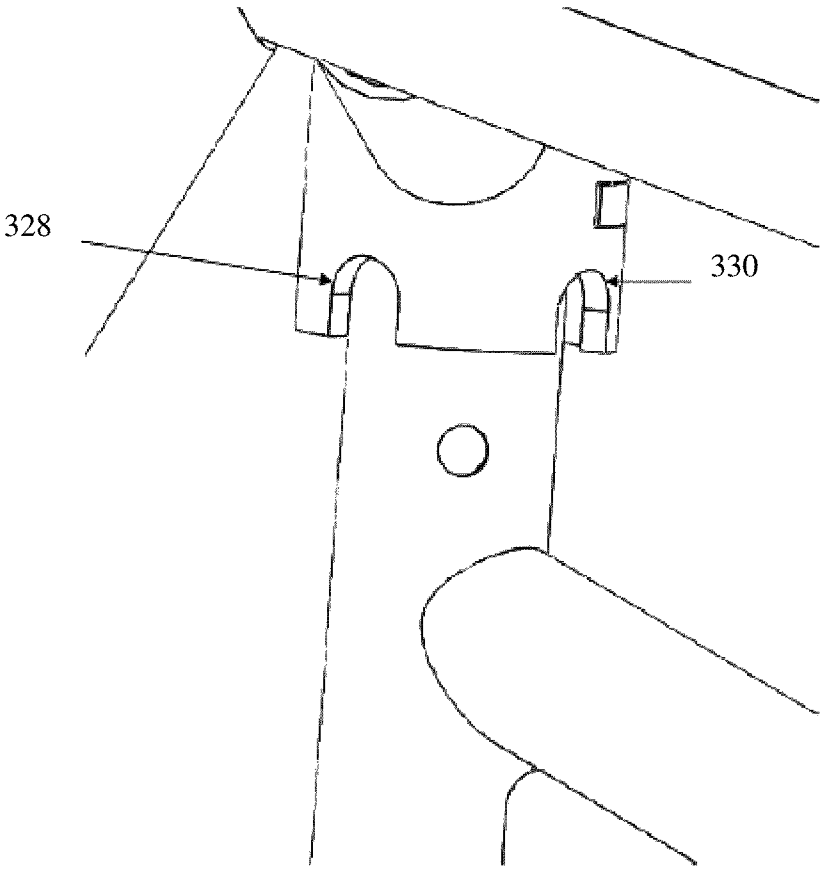

Referring to FIG. 4B and FIG. 4C, the stand 320 may further be engaged into one of first slot 326 in first position, second slot 328 in second position, and third slot 330 in the stand mount 324 through a pin 332 attached to the stand 320. Each of the first slot 326, the second slot 328, and the third slot 330 are provided on frame of the attachment device 300 for each of the first position, the second position and the third position of the stand 320. As the stand 320 is moved to the second slot 328, the stand 320 moves more forward and sideways making into the second position to further act as the anti-tipper. As the stand 320 is moved to the third slot 330 into the third position, the ground clearance increases for use cases as necessary.

In another embodiment, the angle of the stand mount 324 and depth of the each of the second slot 328 and the third slot 330 may be changed to get a desired ground clearance for each of the second position and the third position. In another embodiment, the stand 320 may be selected to extend out of the wheelchair 200 by having one of reflective print or a bigger form factor to make the stand more visible.

Still referring to FIG. 4A, in another embodiment, the wheel chair 200 comprises a front wheel 334. Trail of the front wheel 334 may be adjusted so that the wheel 322 lowers to the ground as the handle 310 in the attachment device 300 is turned in order to further increase an effectiveness of the anti-tipper.

Figure 4D:
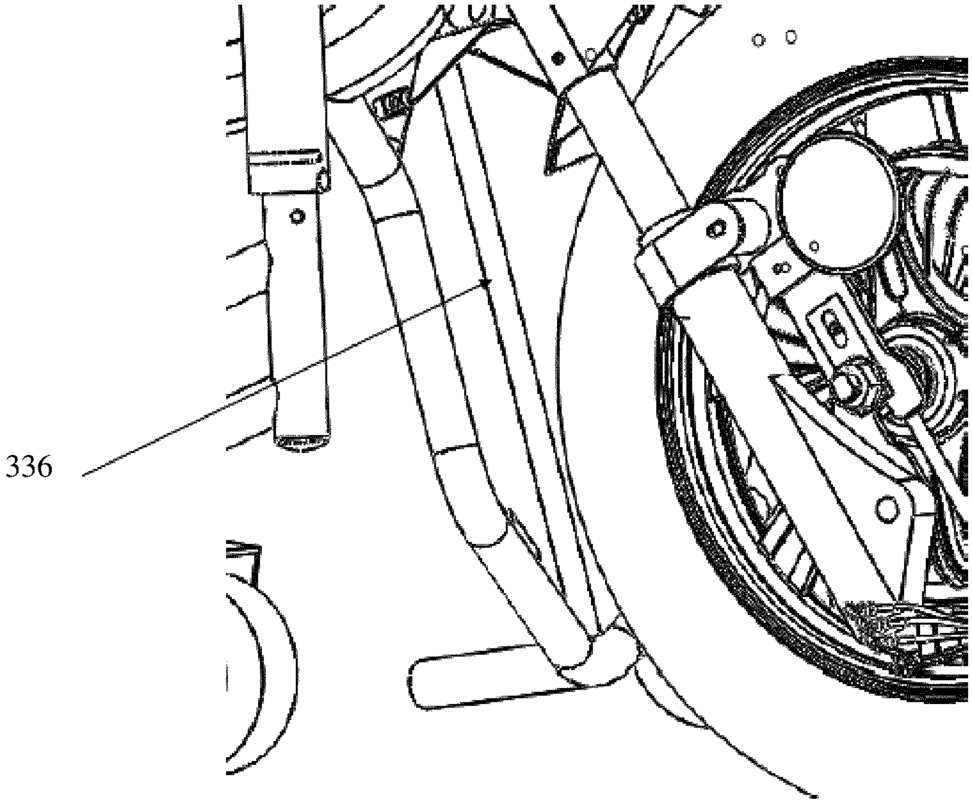
FIG. 4D shows configuration of foot protection barrier in the attachment device, according to embodiments as disclosed herein.

In an embodiment, referring to FIG. 4D, the attachment device 300 comprises a foot protection barrier 336 positioned between feet of the user and the front wheel 334 to provide protection to the users against hitting of leg of the user with the front wheel 334. Conventional flat barrier moves the front wheel 334 forward and thus increases the overall size of the extended wheel chair 100 while reducing the traction on the front wheel 334. For this reason, the conventional flat barrier is modified to the foot protection barrier 336 to protect the user and ensure that the front wheel 334 comes closer. The foot protection barrier 336 may be bent in a manner to provide protection and at the same time ensure enough leg space for the users.

Figure 3C:
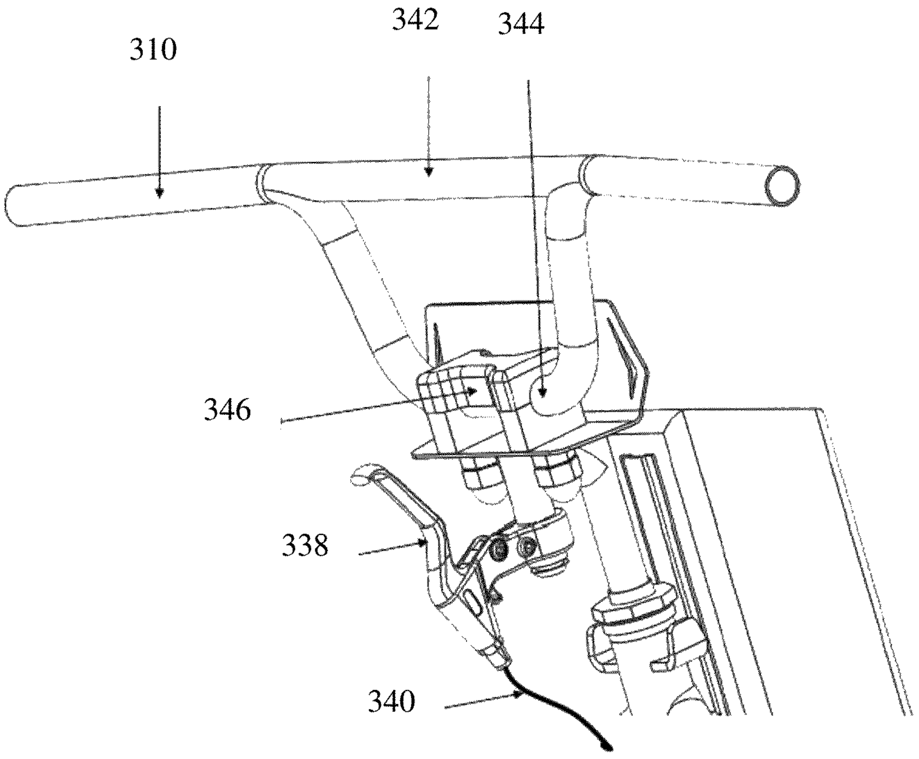
FIG. 3C illustrates details of attachment and detachment mechanism of the attachment device to the wheel chair in the extended wheel chair, according to embodiments as disclosed herein.

In an exemplary embodiment, still referring to FIG. 3C, detachment of the attachment device 300 from the wheelchair 200 will now be explained. The attachment device 300 comprises a detachment lever 338 coupled to the stopper 312 through a cable 340. When the user activates the detachment lever 338, the stopper 312 moves out and detaches the attachment device 300 from the body 202 of the wheel chair 200. The attachment device 300 further comprises the handle 310 provided with a horizontal rod 342. The handle 310 may be used for pushing the horizontal rod 342 to release load on the detachment cable 340. The user may first push the horizontal rod 342 and then press the detachment lever 338. The attachment device 300 may then be lowered slowly by controlling position of horizontal rod 342. Rod 344 adjusts the position of handlebar 310 closer or away from the user by pivoting about clamp 346. The handle 310 with the rod 342 avoids sudden detachment and controls the detachment of the attachment device 300.

Figure 4E:
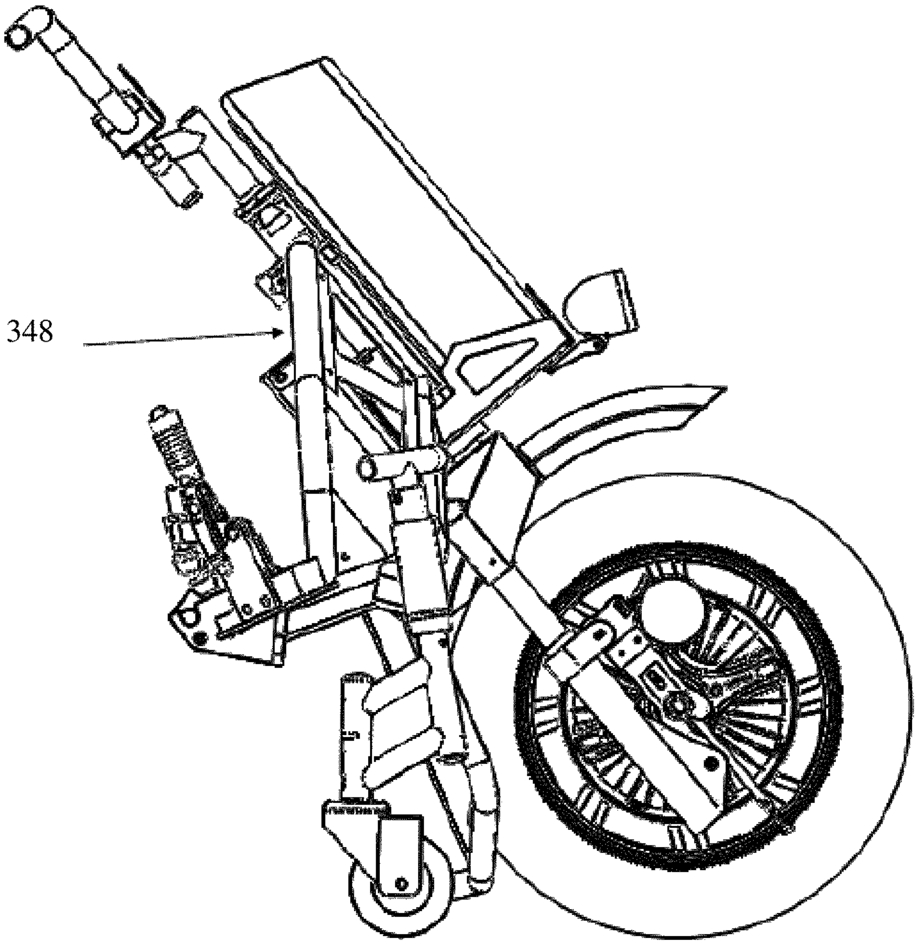
FIG. 4E shows configuration of leg protection provided in the attachment device, according to embodiments as disclosed herein.

In accordance with an embodiment, referring to FIG. 4E, attachment device 300 providing leg protection and strength to the frame of the attachment device 300 is shown.

To improve the overall strength of the structure a supporting tube member 348 is welded. The tube member 348 has been designed such that the tube member 348 comprises a structural element acting as a knee guard to the user in the case of an accident, thereby preventing an external object from directly hitting the leg.

The proposed extended wheel chair 100 converts the wheel chair 200 into a 3 wheeled device by attaching the attachment device 300. The proposed extended wheel chair 100 may be used as a motorcycle. Proposed attachment device is provided with a stand to protect the extended wheelchair from sideways toppling. Safety features such as foot protection helps in protecting foot of the user from hitting. The attachment device in the extended wheel chair provides an easy attachment and detachment through a detachment lever.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. An extended wheel chair, comprising:
 - a wheel chair having a body, wherein the body of the wheel chair comprising:
 - each of a first body part and a second body part mounted over a frame on the wheel chair, wherein the second body part comprises at least two pins and a flat plate; and
 - an attachment device to be mechanically locked to the body of the wheel chair, wherein the attachment device comprising:
   - a body provided with each of a first slot and a second slot, wherein a first pin of the at least two pins is engaged with the first slot, and wherein a second pin of the at least two pins is engaged with the second slot.

2. The extended wheel chair as claimed in claim 1, wherein the attachment device comprises a stand having one or more wheels for supporting the mechanical locking of the attachment device over the wheel chair.

3. The extended wheel chair as claimed in claim 2, wherein the stand is mounted on a stand mount, and wherein the stand is engaged in at least one stand slot in the stand mount through a pin.

4. The extended wheel chair as claimed in claim 1, wherein the body of the attachment device engages the first pin with the first slot by guiding through a slope.

5. The extended wheel chair as claimed in claim 1, wherein the body of the attachment device comprises a handlebar for engaging the second pin with the second slot.

6. The extended wheel chair as claimed in claim 1, wherein the body of the attachment device comprises a stopper for engaging the second pin with the second slot, wherein the stopper comprises a spring enabling a one-way movement of the stopper.

7. The extended wheel chair as claimed in claim 6, wherein the stopper is provided with an incline on a top surface of the stopper such that the second pin pushes the stopper against the incline during the engagement with the second slot.

8. The extended wheel chair as claimed in claim 1, wherein the attachment device comprises:
 - a toggle lock configured on top of the flat plate for enabling a secondary locking mechanism between the wheel chair and the attachment device.

9. The extended wheel chair as claimed in claim 8, wherein the toggle lock is provided with a switch positioned between the toggle lock and the flat plate for enabling the secondary locking mechanism.

10. The extended wheel chair as claimed in claim 6, wherein the attachment device comprises:
 - a detachment lever coupled to the stopper through a cable for detaching the attachment device from the wheel chair, wherein the detachment lever is pushed for detaching the attachment device.

11. The extended wheel chair as claimed in claim 1, wherein the body of the attachment device is welded on a plate at one or more widths.

12. The extended wheel chair as claimed in claim 1, wherein the body of the attachment device comprises a mirror mounted on a handle on the body of the attachment device.

13. A wheel chair, comprising:
 - a body comprising:
 - each of a first body part and a second body part mounted over a frame on the wheel chair, wherein the second body part comprises at least two pins and a flat plate, wherein each of a first pin and a second pin of the at least two pins to be engaged with one or more slots of an attachment device in order to enable a mechanical locking of the attachment device with the wheel chair.

14. The wheel chair as claimed in claim 13, wherein the attachment device comprising:
 - a body provided with each of a first slot and a second slot, wherein each of the first slot and the second slot are configured to be engaged with one or more pins in the wheel chair along with a stopper; and
 - a stand having one or more wheels with a stand mount for supporting the mechanical locking of the attachment device with the wheel chair.

15. The wheel chair as claimed in claim 14, wherein the body comprises the stopper and a handlebar for engaging the second pin with the second slot.

16. The wheel chair as claimed in claim 14, wherein the stand is mounted on the stand mount, and wherein the stand is engaged in at least one stand slot in the stand mount through a pin.

17. The wheel chair as claimed in claim 14, wherein the body of the attachment device engages the first pin with the first slot by guiding through a slope with the help of the stopper.

18. The wheel chair as claimed in claim 14, wherein the body comprises the stopper for engaging the second pin with the second slot, wherein the stopper comprises a spring enabling a one-way movement of the stopper.

19. The wheel chair as claimed in claim 18, wherein the stopper is provided with an incline on a top surface of the stopper such that the second pin pushes the stopper against the incline during the engagement with the second slot.

20. The wheel chair as claimed in claim 14, wherein the attachment device comprises:
 - a detachment lever coupled to the stopper through a cable for detaching the attachment device from the wheel chair, wherein the detachment lever is pushed through a horizontal rod for detaching the attachment device.

21. The wheel chair as claimed in claim 13, wherein the attachment device comprises:
 - a toggle lock configured on top of the flat plate for enabling a secondary locking mechanism between the wheel chair and the attachment device.

22. The wheel chair as claimed in claim 21, wherein the toggle lock is provided with a switch positioned between the toggle lock and the flat plate for enabling the secondary locking mechanism.

23. The wheel chair as claimed in claim 13, wherein the body of the attachment device is welded on a plate at one or more width.

24. The wheel chair as claimed in claim 13, wherein the attachment device comprises a mirror mounted on a handle on the body of the attachment device.

* * * * *